(12) United States Patent
Meyer et al.

(10) Patent No.: US 7,537,747 B2
(45) Date of Patent: May 26, 2009

(54) HYDROGEN STORAGE MIXED GAS SYSTEM METHOD

(75) Inventors: Martin S Meyer, Southfield, MI (US); Frederick E Pinkerton, Shelby Township, MI (US); Gregory P Meisner, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 928 days.

(21) Appl. No.: 10/860,628

(22) Filed: Jun. 3, 2004

(65) Prior Publication Data

US 2005/0271581 A1 Dec. 8, 2005

(51) Int. Cl.
*C01B 21/092* (2006.01)
*C01B 3/04* (2006.01)
*C01B 6/04* (2006.01)
*C01B 6/06* (2006.01)
*C01B 6/24* (2006.01)
*C01B 6/00* (2006.01)
*C01B 6/02* (2006.01)

(52) U.S. Cl. ............... 423/413; 423/644; 423/645; 423/646; 423/647; 423/648.1

(58) Field of Classification Search ............ 423/644, 423/645, 646, 647, 413, 648.1
See application file for complete search history.

(56) References Cited

U.S. PATENT DOCUMENTS

| | | | | |
|---|---|---|---|---|
| 3,728,434 A * | 4/1973 | Sanders | | 423/274 |
| 4,007,257 A | 2/1977 | Lemieux et al. | | 423/646 |
| 4,383,837 A * | 5/1983 | Smith | | 48/197 R |
| 4,396,589 A * | 8/1983 | Bogdanovic | | 423/409 |
| 4,400,348 A * | 8/1983 | Osumi et al. | | 420/443 |
| 4,425,318 A * | 1/1984 | Maeland et al. | | 423/644 |
| 4,554,153 A * | 11/1985 | Bogdanovic | | 423/647 |
| 4,555,395 A * | 11/1985 | Sirovich et al. | | 423/644 |
| 4,957,727 A * | 9/1990 | Bogdanovic | | 423/647 |
| 6,015,041 A | 1/2000 | Heung | | |
| 6,159,538 A | 12/2000 | Rodriguez et al. | | |
| 6,267,229 B1 | 7/2001 | Heung | | |
| 6,329,076 B1 | 12/2001 | Kawabe et al. | | |
| 6,342,198 B1 | 1/2002 | Zaluska et al. | | |
| 6,419,764 B1 | 7/2002 | Kamiya et al. | | |
| 6,432,379 B1 | 8/2002 | Heung | | |
| 6,444,361 B1 | 9/2002 | Komori et al. | | |
| 6,946,112 B2 | 9/2005 | Chen et al. | | 423/645 |
| 6,967,012 B2 | 11/2005 | Meisner et al. | | 423/413 |
| 7,029,649 B2 | 4/2006 | Meisner et al. | | 423/658.2 |
| 2003/0113252 A1 | 6/2003 | Chen et al. | | |
| 2003/0129122 A1 | 7/2003 | Chen et al. | | |
| 2003/0129126 A1 | 7/2003 | Chen et al. | | |

(Continued)

OTHER PUBLICATIONS

Chen, Ping, Xiong, Zhitao, Luo, Jizhong, Lin, Jianyi, Tan, Kuang Lee. "Hydrogen Storage in Metal Nitride Systems". Edited by Ricardo B. Schwartz Symposium V, Materials for Energy Storage, Generation and Transport, vol. 730, Apr. 2-4, 2002, pp. 376 and 385, V5.18.

(Continued)

*Primary Examiner*—Wayne Langel (57) ABSTRACT

A system comprising solid media and a gaseous atmosphere, said solid media having a first condition which is hydrogenated and a second condition which is partially or fully dehydrogenated relative to said first condition, and wherein said gaseous atmosphere comprises nitrogen.

30 Claims, 10 Drawing Sheets

U.S. PATENT DOCUMENTS

| | | | |
|---|---|---|---|
| 2004/0265222 A1 | 12/2004 | Meisner et al. | 423/648.1 |
| 2005/0191236 A1 | 9/2005 | Pinkerton et al. | 423/658.2 |
| 2005/0271581 A1 | 12/2005 | Meyer et al. | 423/658.2 |
| 2006/0057049 A1 | 3/2006 | Pinkerton et al. | 423/284 |

OTHER PUBLICATIONS

Herbert Jacobs and Robert Juza, "Preparations and Properties of Magnesium Amide and Imide" Journal of Anorganic and General Chemistry, Band [vol.] 870 (1969) pp. 254-261. (English translation only; original German not available.).

Chen, Ping, Xiong, Zhitao, Luo, Jizhong, Lin, Jianyi, Tan, Kuang Lee. "Interaction of Hydrogen with Metal Nitrides and Imides" Nature Publishing Group [vol. 420] (Nov. 21, 2002) pp. 302-304 with Supplement pp. 1-6.

Robert Juza and Karl Opp, Metal amides and metal nitrades, 25th Part 1), Journal for Anorganic and General Chemistry. 1951 Band vol. 266, pp. 325-330. (2 documents: English translation and original German.).

Cenzual et al., "Inorganic Structure Types with Revised Space Group", Acta Cryst., vol. B47 (1991) 433-439.

Chen et al., "Hydrogen Storage in Metal Nitride Systems", Edited by Ricardo B. Schwartz, Symposium V, Materials for Energy Storage, Generation and Transport, vol. 730 (Apr. 2-4, 2002) 376 and 385.

Chen et al., "Interaction of Hydrogen with Metal Nitrides and Imides", Nature Publishing Group [vol. 420] (Nov. 21, 2002) 302-304 with Supplement pp. 1-6.

Goubeau, et al., "Über ternäre Metall-Bornitride", Zeitschrifte für anorganishe und allgewieine, Chemic vol. 310 (1961) 248-260.

Hu et al., "Ultrafast Reaction between LiH and $NH_3$ during $H_2$ Storage in $Li_3N$"; J. Phys. Chem. A; vol. 107, No. 46 (Nov. 20, 2003) 9737-9739.

Ichikawa et al., "Mechanism of Novel Reaction for LiNH and LiH to $Li_2NH$ and $H_2$ as a Promising Hydrogen Storage System"; J. Phys. Chem. B; vol. 108, No. 23 (May 5, 2004) 7887-7892.

Jacobs et al., "Preparations and Properties of Magnesium Amide and Imide", Journal for Anorganic and General Chemistry, Band [vol.] 870 (1969) 254-261. (English translation only; original German not available).

JCPDS X-Ray Database; pattern No. 00-007-0245—$Li_3AlN_2$.
JCPDS X-Ray Database; pattern No. 00-036-1016—$\beta$-$Mg_3B_2N_4$.
JCPDS X-Ray Database; pattern No. 00-042-0868—$Mg_3BN_3$.
JCPDS X-Ray Database; pattern No. 00-044-1497—$Mg_3BN_3$.
JCPDS X-Ray Database; pattern No. 16-273—$Li_3BN_2$.
JCPDS X-Ray Database; pattern No. 40-1166—$Li_3BN_2$.
JCPDS X-Ray Database; pattern No. 80-2274—$Li_3BN_2$.

Juza et al., "Die ternären Nitride $Li_3AlN_2$ und $Li_3GaN_2$"; Zeitschrifte für Anorganische Chemic, vol. 257 (1948) 13-25.

Juza et al., "Metal amides and metal nitrides", 25$^{th}$ Part, Journal for Anorganic and General Chemistry, 1951 vol. 266, 325-330. (English translation and German language document).

Pinkerton et al., "Hydrogen Desorption Exceeding Ten Weight Percent from the New Quaternary Hydride $Li_3BN_2H_8$" ACS Publications, http://pubs.acs.org/cgi-bin/abstract.cgi/jpcbfk/2005/109/i01/abs/jp0455475.html.

Pinkerton et al., "Bottling the Hydrogen Genie", The Industrial Physicist, (Feb./Mar. 2004) 20-23.

Villars et al., "ASM International Handbook of Ternary Alloy Phase Diagrams", Al Li N; Al$Li_3N_2$ (1) Crystallographic Data (1997).

Villars et al., "ASM International Handbook of Ternary Alloy Phase Diagrams", B Li N; B$Li_3N_2$ (LT) (2) Crystallographic Data (1997).

Villars et al., "ASM International Handbook of Ternary Alloy Phase Diagrams", B Li N; B$Li_3N_2$ (HT) (2) Crystallographic Data (1997).

Villars, P., "Pearson's Handbook Desk Edition", Crystallographic Data for Intermetallic Phases, Ac—$Cr_2Se_4Zr$, vol. 1, p. 416 (1997) 771 and 776.

Yamane et al., "High- and Low-Temperature Phases of Lithium Boron Nitride, $Li_3BN_2$ Preparation, Phase Relation, Crystal Structure, and Ionic Conductivity", J. Solid State Chemistry, vol. 71, 1987) 1-11.

Yamane et al., "Structure of a New Polymorph of Lithium Boron Nitride, $Li_3BN_2$", J. Solid State Chemistry, vol. 65, (1986) 6-12.

\* cited by examiner

Figure 10

HYDROGEN STORAGE MIXED GAS SYSTEM METHOD

FIELD OF THE INVENTION

The present invention relates to hydrogen storage, the methods and compositions.

BACKGROUND OF THE INVENTION

Hydrogen is desirable as a source of energy because it burns cleanly in air producing water as a by-product. In order to enhance the desirability of hydrogen as a fuel source, particularly for mobile applications, it is desirable to increase the available hydrogen content per unit volume of storage. Presently, this is done by conventional means such as storage under high pressure, at thousands of pounds per square inch, cooling to a liquid state, or absorbing into a solid such as a metal hydride. Pressurization and liquification require relatively expensive processing and storage equipment.

Storing hydrogen in a solid material such as metal hydrides, provides volumetric hydrogen density which is relatively high and compact as a storage medium. Binding the hydrogen as a solid is desirable since it desorbs when heat is applied, thereby providing controllable desorption.

Rechargeable hydrogen storage devices have been proposed to facilitate the use of hydrogen. Such devices may be relatively simple and generally are simply constructed as a shell and tube heat exchanger where the heat transfer medium delivers heat for desorption. Such heat transfer medium is supplied in channels separate from the chamber which houses the hydrogen storage material. Therefore, when hydrogen release is desired, hot fluid may be circulated through the channels, in heat transfer relationship with the storage material, to facilitate release of the hydrogen. To recharge the storage medium, hydrogen may be pumped into the chamber and flow through the storage material while the heat transfer medium removes heat, thus facilitating the charging or hydrogenating process. An exemplary hydrogen storage material and storage device arranged to provide suitable heat transfer surface and heat transfer medium for temperature management is exemplified in U.S. Pat. No. 6,015,041.

Presently, magnesium and magnesium-based alloys are considered to be the highest capacity hydrogen storage material with some reversible performance. However, there is limitation in that such magnesium based materials take up hydrogen at very high temperature and high hydrogen pressure. In addition, hydrogenation of the storage material is typically impeded by surface oxidation of the magnesium.

Therefore, in response to the desire for an improved hydrogen storage system, the present invention provides an improved hydrogen system, composition, and method of operation.

SUMMARY OF THE INVENTION

It is undesirable to expose fuel cell catalyst to ammonia. Ammonia present in hydrogen feed gas to the fuel cell, even at very low concentrations is undesirable. Ammonia is quite chemically reactive and may degrade other components of the hydrogen fuel system, aside from the fuel cell itself.

By the present invention there is provided systems and methods for mitigating, preventing, or at least counteracting to some extent, the production of ammonia. It has been determined that the addition of nitrogen to the atmosphere in contact with the hydrogen storage material suppresses ammonia production and contributes to causing the equilibrium of reaction to be driven in the desirable direction; that is, not favoring ammonia formation.

Accordingly, any amount of nitrogen by volume in the system is beneficial. In the system, as hydrogen is added to the metal-nitrogen compound (exemplary imide) to form the hydrogenated metal-nitrogen compound (exemplary amide), it is desirable to have some amount of nitrogen present along with the hydrogen in the atmosphere to counteract decomposition of the metal-nitrogen hydrogenated compound (amide) as it is formed during uptake of hydrogen by the metal-nitrogen compound (imide). In the exemplary amide/imide system, once the system is hydrogenated or hydrided, and essentially all of the imide has reacted with hydrogen to form an amide, it is desirable to maintain the amide/hydride storage material in an atmosphere that comprises nitrogen. Further, upon cycling of the amide/hydride storage material to release hydrogen, it is desirable to maintain such material in a nitrogen-containing atmosphere during dehydriding or dehydrogenation, as hydrogen is evolved therefrom. In the case where the hydrogenated material is held under the nitrogen-containing atmosphere and in the case where the hydrogen-containing material is cycled to release hydrogen therefrom, the nitrogen-containing atmosphere may also desirably comprise any inert gas, such as helium and argon. The term "inert" refers to any gas that does not participate in or affect the hydrogen storage reaction; that is, hydriding or dehydriding.

Therefore, such atmosphere may comprise nitrogen alone, or nitrogen in combination with other gasses such as hydrogen or helium. By the present work, it was recognized for the first time that decomposition of the amide is problematic and will continue until essentially all the amide is consumed, rendering the hydrogen storage material essentially effectively useless.

In the present invention, various compositions containing nitrogen were explored, including nitrogen-containing systems having a small amount of nitrogen greater than zero volume percent nitrogen or having some amount of nitrogen present in the system and up to 100% nitrogen, except in the case where hydrogen is desirable to be included in the atmosphere in order to achieve hydriding or hydrogenation. In cases where hydriding or hydrogenation is undertaken, hydrogen will be present in the atmosphere in compositions containing hydrogen including up to just under 100 volume percent hydrogen and having nitrogen present. A 50/50 volume percent hydrogen and nitrogen system is practical for use with a fuel cell.

In another aspect, the invention provides a hydrogen storage system utilizing a $H_2$ storage medium having a hydrogenated state and a dehydrogenated state. In a preferred system, such medium comprises a hydrogenated metal-nitrogen compound such as an amide in the hydrogenated state; most preferably, such composition comprises an amide and a hydride. The amide is preferably represented by the general formula $MI^d[(NH_2)^{-1}]_d$ and the hydride is preferably represented by the general formula $MII^f H_f$, where MI and MII respectively represent cationic species or a mixture of cationic species other than hydrogen, and d and f respectively represent the average valence states.

In a dehydrogenated state, the medium comprises a metal-nitrogen compound such as an imide, which is represented by the formula $M^c[(NH)^{-2}]_{c/2}$, where M represents at least one cationic species other than hydrogen and c represents the average valence state of M.

In the method of the invention of hydrogen storage, storage is accomplished with a gaseous mixture comprising $N_2$ and $H_2$. According to the present invention, a gaseous mixture comprising hydrogen gas and $N_2$ gas is contacted with the metal-nitrogen compound, such as the imide having one or more cations besides hydrogen, and upon uptake of hydrogen forms at least two distinct compounds different from the imide namely, the amide and one other compound, preferably the hydride.

As the imide takes up hydrogen for storage therein, heat is released and the aforesaid amide is formed. Thus, the imide is an exothermic hydrogen absorber. However, in a competing reaction, such as in the case of an exemplary amide, two atomic units of amide combine to release $NH_3$ and reform the imide. This competitive reaction is undesirable and the presence of $N_2$ mitigates occurrence of such competing reaction.

The $N_2/H_2$ mixture permits $H_2$ uptake while not promoting $NH_3$ formation as is the case in equivalent conditions under $H_2$ atmosphere at the same temperature and pressure. This preserves the hydrogenated metal-nitrogen compound such as amide for use in the reverse reaction. Thus, when the hydrogenated compound such as amide and the hydride release hydrogen in the presence of one another, driven by heat, and the imide is formed, decomposition of amide is avoided. Accordingly, heat is used to cause the amide and the hydride to desorb or release hydrogen, and this reaction is endothermic. The extent of this reaction is related to the mass of sorbent amide material available. Thus the mitigation of $NH_3$ formation is desirable.

As used herein, the term "metal-nitrogen compound" also encompasses metalloid-nitrogen compounds.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In one aspect, the nitrogen-containing atmosphere of the invention is utilized in an exemplary hydrogen storage system having a hydrogenated state and a dehydrogenated state, therein providing two distinct physical states where hydrogen can be stored and subsequently released. In the hydrogenated state, such composition comprises an exemplary amide and a hydride, each of which are solids. The amide is preferably represented by the general formula $MI^d[(NH_2)^{-1}]_d$ and the hydride is preferably represented by the general formula $MII^f H_f$, where MI and MII respectively represent cationic species or a mixture of cationic species other than hydrogen, and d and f respectively represent the average valence states.

In a dehydrogenated state, the composition comprises an imide, which is a solid and is represented by the formula $M^c[(NH)^{-2}]_{c/2}$, where M represents at least one cationic species other than hydrogen and c represents the average valence state of M.

In one aspect of the method of hydrogen storage of the present invention, a gaseous mixture comprising nitrogen and hydrogen is contacted with the imide having such one or more cations besides hydrogen, and upon uptake of hydrogen, forms at least two distinct compounds different from the imide namely, the amide and the hydride. This corresponds to the hydrogenated state for the storage material. The nitrogen and hydrogen-containing atmosphere leads to lessened formation of $NH_3$ (ammonia) as compared to an atmosphere which does not contain nitrogen.

A preferred imide is lithium imide represented by the formula $Li_2NH$, wherein the cation species is lithium, and the preferred distinct compounds formed upon hydrogen uptake are the amide represented by formula $LiNH_2$, and the hydride represented by the formula $LiH$. The tendency for decomposition of 2 molecular units of $LiNH_2$ (amide) to form $Li_2NH$ (imide) and ammonia ($NH_3$) is lessened.

In the absence of nitrogen, decomposition by producing $NH_3$ will occur any time the hydrogen storage material is at elevated temperature greater than about 155° C. and the material is in the hydrided state, or even a partially hydrided state. It only requires that some $LiNH_2$ be present in order to have the source material for the decomposition reaction. Therefore, for effective suppression it is necessary for $N_2$ to be present any time the sample is at elevated temperature. The only exception is when the sample has been completely dehydrided—then the sample cannot decompose because there is no $LiNH_2$. In practice in a real system, this will never be the case (it amounts to running the tank completely dry, to use the gasoline equivalent). In a real system, it is desirable for $N_2$ to always be present.

In a hydrogenated state, or while hydrogen is being released, decomposition will occur even in an inert atmosphere such as pure He. For example, experimental data on the system $LiNH_2+LiH$ shows that the amount of weight loss (5.2 wt %) during dehydriding in 130 kPa He gas at 240° C. is greater than the amount of weight gain (4.7 wt %) during the subsequent hydriding in a mixture of 50% $H_2$/50% $N_2$ gas at 260 kPa and 230° C. The extra weight represents the $NH_3$ lost during dehydriding in pure He. At elevated temperature, there is weight loss both due to $H_2$ removal and due to $NH_3$ removal. The weight loss stops in pure He once the sample is fully dehydrided, but that is because the surviving hydrogen storage portion of the sample has been fully converted to $Li_2NH$ and there is no more $LiNH_2$ in the sample to decompose.

Referring back to the exemplary systems of the invention, it should be understood that in the present invention M, MI and MII each represent a cationic species or mixture of cationic species other than hydrogen. Examples are metal cations, non-metal cations such as boron, and non-metal cations which are organic such as $CH_3$. Elements that form preferred amides, imides, hydride-nitrides, and mixtures of cations in the type of compounds of the present invention are as follows. For amides the cationic species comprise: Li, Be, Na, Mg, K, Ca, Ni, Rb, Sr, In, Cs, Ba, La, Sm, Eu, and Yb. For imides the cationic species comprise: Li, Na, Mg, Ca, Sr, Ba, La, Eu, and Th. For hydride-nitride the cationic species comprise: Si, Ca, Ti, Sr, Zr, Ba, and Th. For mixed amide/imide the cationic species comprise: Li, Be, Na, Mg, Al, Si, K, Ca, Mn, Zn, Ga, Rb, Sr, Y, In, Sn, Cs, Ba, La, Pb, Ce, Nd, Sm, Eu, Gd, and Yb. For other related materials such as coordination-type NH-containing materials the cationic species comprise: Li, Be, B, Na, K, Ca, Ni, Cu, As, Se, Sr, In, Sb, La, W, Eu, and Th. Evaluation of the aforesaid known species produces, by analogy the following added cationic species besides those recited above which are thought to be usable but not yet demonstrated, include Fe, Sc, Ge, Cd, Hf, Hg, Tl, and Pr. In view of the above, the cationic species generally comprise: aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), and zirconium (Zr).

An analysis of the behavior and crystallography of the aforesaid amides, imides, hydride/nitride, mixed amide/imide, and other related materials such as coordination-type NH-containing materials reveals that some of the aforesaid compounds such as lithium demonstrate a relatively simple chemistry of the amide and the imide. Other materials, particularly hydride/nitride compounds involving calcium and relatively heavier cation elements, form related phases based upon systematic behavior demonstrated by the imides and amides and according to the literature. Such related materials are not necessarily characterized as an amide or an imide and principally fall into the category of the hydride/nitride stated earlier. Such materials involve hydrogen and nitrogen and comprise cationic species and ammonia complexes, so they are ammonia-containing materials, but not amides or imides. Such more complex type salts involve the aforesaid cations having a higher number of nitrogen surrounding it as compared to the amide and imides. For example, simple lithium amide has an Li coordinated with one $NH_2$. Whereas, the more complex compounds have the lithium coordinated with more than one $NH_3$ group. Therefore, the invention encompasses all of the hydrogen storage capable nitride/hydride type materials and compounds some of which involve cations having affinity to ammonia as well as the more traditional $NH_2$. The invention also contemplates intermediate products arising during a series of reactions in the gas and solid phases associated with the hydrogen storage media.

It should be noted that M, MI and MII are independently selected and each may be different, or any two or more may be the same, cationic species. Preferably M, MI and MII each represent one or a mixture selected from the group consisting of lithium, magnesium, sodium, boron, aluminum, beryllium, and zinc. In a preferred embodiment, all such M, MI and MII represent lithium, or mixed metal including lithium, such as LiNa.

As the imide takes up hydrogen for storage therein, heat is released and the aforesaid amide and hydride are formed. Thus, the imide is an exothermic hydrogen absorber. In the reverse reaction, the amide and hydride release hydrogen in the presence of one another, driven by heat, and the imide is formed. Accordingly, heat is used to cause the amide and the hydride to desorb or release hydrogen.

Preferred temperature and pressure conditions for charging the hydrogen into the storage material are temperatures in a range from about room temperature to about 380° C. and $H_2$ pressures from about 0 (vacuum) to about 1000 kPa. At about 380° C. and less than about 1000 kPa $H_2$ pressure, hydrogen will tend to be released. At lower temperatures the $H_2$ pressure to release is correspondingly lower.

It should be noted that the system behaves in a manner whereby at each temperature, there is a threshold $H_2$ pressure above which hydrogen is absorbed and below which hydrogen is desorbed. For example, at 125° C. in order to desorb, the $H_2$ pressure is preferably less than 10 kPa. It is possible to desorb hydrogen at $H_2$ pressures less than about 1000 kPa at temperatures higher than about 340° C. By way of further example, at room temperature, the $H_2$ pressure for hydrogen release is near zero, vacuum. At elevated temperatures, on the order of 380° C., hydrogen is released until an $H_2$ pressure above about 1000 kPa is reached. Then at such sufficiently elevated pressure, hydrogen is inserted. The term "$H_2$ pressure" is used to distinguished from the overall pressure of the gas mixtures. The cycling of $H_2$ is related to and depends on the hydrogen pressure, and is relatively independent of the total pressure of a mixed gas.

Particle size of the storage material is related to its performance. Particles that are too coarse extend the time for absorption/desorption at a given temperature. It has been found that starting material particle size on the order of 500 microns (one half millimeter) ball milled for 1 to 10 hours form suitable material. This results in particle size on the order of less than about 10 microns.

In still another aspect of the invention, there is provided a method for forming the imide based hydrogen storage material which comprises reacting the amide in the presence of the hydride to form the imide storage medium. Here, the amide and hydride in particulate form are mixed together and heated to release hydrogen and form the imide product, under atmosphere containing nitrogen.

The foregoing lithium storage system based upon the imide absorbs hydrogen at a temperature of preferably greater than or equal to 145° C. and hydrogen pressures as low as 5 kPa, but preferably greater than or equal to 15 kPa. In a preferred system, the amide and hydride constituents release or desorb hydrogen at a temperature greater than or equal to 125° C. and at hydrogen pressure that is less than or equal to 10 kPa, thereby forming the imide constituent as heretofore described.

Use of the nitrogen and hydrogen-containing atmosphere which leads to lessened formation of $NH_3$ (ammonia) as compared to an atmosphere which does not contain nitrogen, will now be further explained by reference to examples. In these examples, the tendency for irreversible decomposition of amide to form ammonia in the absence of nitrogen is shown for the various species and genus as described herein as exemplified by the Li species. The beneficial effect of nitrogen is also clearly demonstrated.

In use, the invention relates to the reversible hydrogen storage reaction given by:

$$LiNH_2 + LiH \leftrightarrow Li_2NH + H_2 \text{ (6.5 wt \% theoretical hydrogen capacity)}. \quad (1)$$

In the hydrided state, $LiNH_2$ can also irreversibly decompose at temperatures greater than 155° C. according to:

$$2\, LiNH_2 \rightarrow Li_2NH + NH_3. \quad (2)$$

Thus the hydrided material will readily decompose by releasing ammonia at the operating temperature of the hydriding/dehydriding (hydrogenating/dehydrogenating) reaction ($\geq 175°$ C.). In the presence of hydrogen gas, the combined effect of reactions (1) and (2) is to completely convert the material over time to LiH and ammonia gas, thereby destroying its ability to store and release hydrogen.

Adding nitrogen gas to the working atmosphere inhibited ammonia production. Initial experiments used a gas mixture containing 8% $H_2$ and 92% $N_2$, which constitutes a very nitrogen-rich mixture. Good results were obtained. In order to further examine the effect of nitrogen concentration on ammonia suppression, the inhibitory effects of a 50% $H_2$/50% $N_2$ mixture were compared to both pure $H_2$ gas and to a nitrogen-rich 5% $H_2$/95% $N_2$ mixture in the examples below. The 50% $N_2$ mixture also provides ammonia inhibition, and the data suggest that ammonia inhibition improves with increasing $N_2$ concentration. Accordingly, any amount of nitrogen present in the atmosphere is beneficial, with the extent of benefit increasing with increasing nitrogen.

EXAMPLE $LiNH_2$+LiH hydrogen storage materials were prepared by combining stoichiometric quantities of the two starting compounds, $LiNH_2$ and LiH, in a hardened steel ball mill jar along with one large and two small steel milling balls. The total weight of the mixed powder was 1 gram. In order to protect the material from air exposure, the jar was loaded and sealed under an Ar inert gas atmosphere inside of a glove box. The mixed material was then ball milled for 10 hours using a SPEX 8000 Mixer/Mill in order to reduce the particle size and to intimately mix the two constituents. Several such 1 gram batches were prepared in the course of the experiments.

Hydrogen release and ammonia production were evaluated using a Cahn Model 2151 high-pressure thermogravimetric analyzer (TGA). The weight of the sample was monitored as it was heated in a hydrogen or mixed hydrogen-nitrogen atmosphere. Release of either hydrogen or ammonia appears as weight loss from the sample. Simultaneously, a mass spectrometer was used to perform residual gas analysis (RGA) of the gas flowing through the TGA. The RGA signal at mass 17 amu thus provided an independent measurement of the quantity of ammonia $NH_3$ given off by the sample.

Three gas concentrations were used:
100% $H_2$— at least 99.999% hydrogen
50% $H_2$/50% $N_2$ by volume
5% $H_2$/95% $N_2$ by volume The 100% $H_2$ (nitrogen-free) gas was the baseline case for comparison of ammonia production. Pure $H_2$ gas was used at the minimum working gas pressure of the TGA, 130 kPa.

For each of the mixed gas concentrations, the material was tested at two different pressures. In one case, the mixed gas used was at the same pressure as the pure $H_2$, namely 130 kPa. Alternatively, a total pressure was used that would provide a 130 kPa $H_2$ partial pressure; i.e., 260 kPa for the 50% $H_2$ mixture and 2600 kPa for the 5% $H_2$ mixture. For these pressures the amount of hydrogen present remains constant, which helps ensure that results are due to the nitrogen gas. The experimental conditions were as in Table 1:

TABLE 1

Experimental conditions used in ammonia suppression tests.

| | Baseline pressure (kPa) | 130 kPa $H_2$ partial pressure equivalent (kPa) |
|---|---|---|
| 100% H2 | 130 | N/A |
| 50% H2 | 130 | 260 |
| 5% H2 | 130 | 2600 |

Stepped Temperature Experiments

Figure 1:
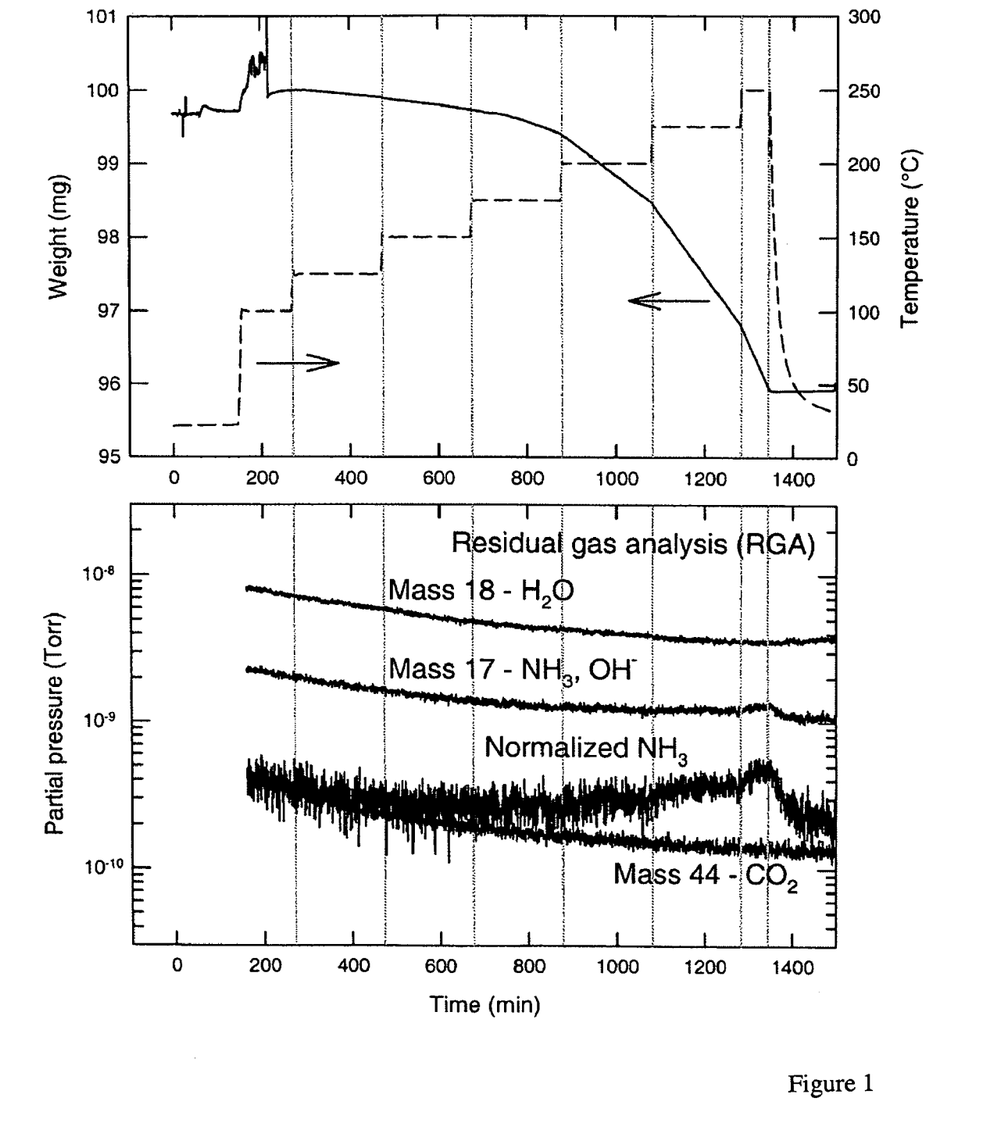
FIG. 1 shows weight loss as a function of time for a typical stepped temperature thermogravimetric analyzer (TGA) experiment (upper panel), and the corresponding residual gas analysis (RGA) signal from mass 18, mass 17, mass 44, and the normalized $NH_3$ signal extracted from them. The system is $LiNH_2+LiH$ in 100% $H_2$ gas at a pressure of 130 kPa.
Figure 2:
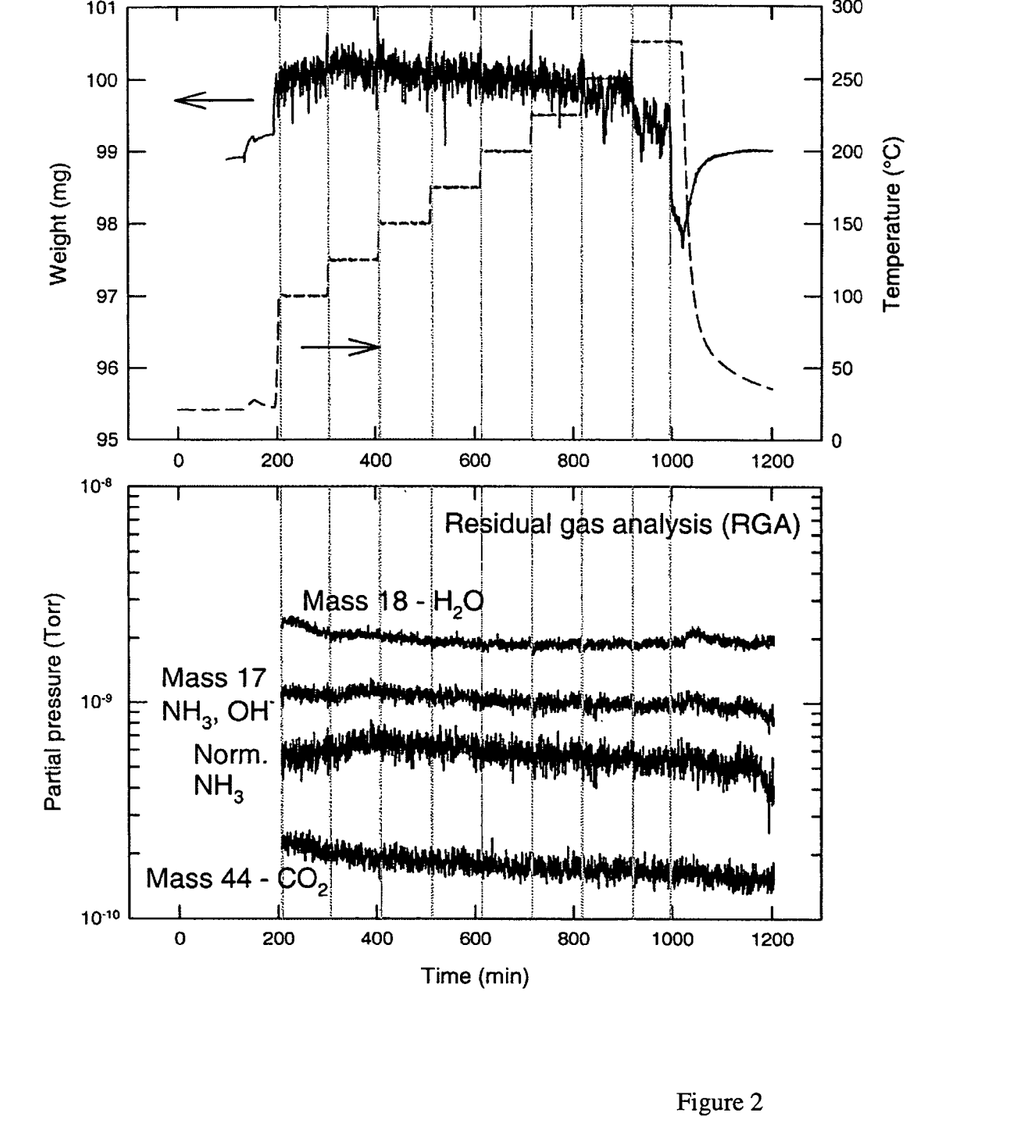
FIG. 2 shows TGA weight loss and RGA signal for the system $LiNH_2+LiH$ in a 5% $H_2/95\%$ $N_2$ gas mixture at a pressure of 2600 kPa (130 kPa $H_2$ partial pressure).

In these experiments the temperature was increased in 25° C. increments from 100° C. to 275° C. At each step the temperature was held constant for a period of time ranging from 100 to 200 min. As examples, FIG. 1 shows the stepped temperature experiment for the baseline case, 100% $H_2$ gas at 130 kPa pressure, while FIG. 2 shows a similar experiment for 5% $H_2$/95% $N_2$ gas at 2600 kPa. The upper panel shows the temperature profile (dashed curve) and the accompanying weight loss (solid curve). The lower panel shows the corresponding RGA signal for the gas species relevant to ammonia production, namely mass 18 ($H_2O$), mass 17 ($NH_3$ and the OH⁻ ionized radical of $H_2O$) and mass 44 ($CO_2$), along with the "normalized" $NH_3$ signal explained below.

Figure 3:
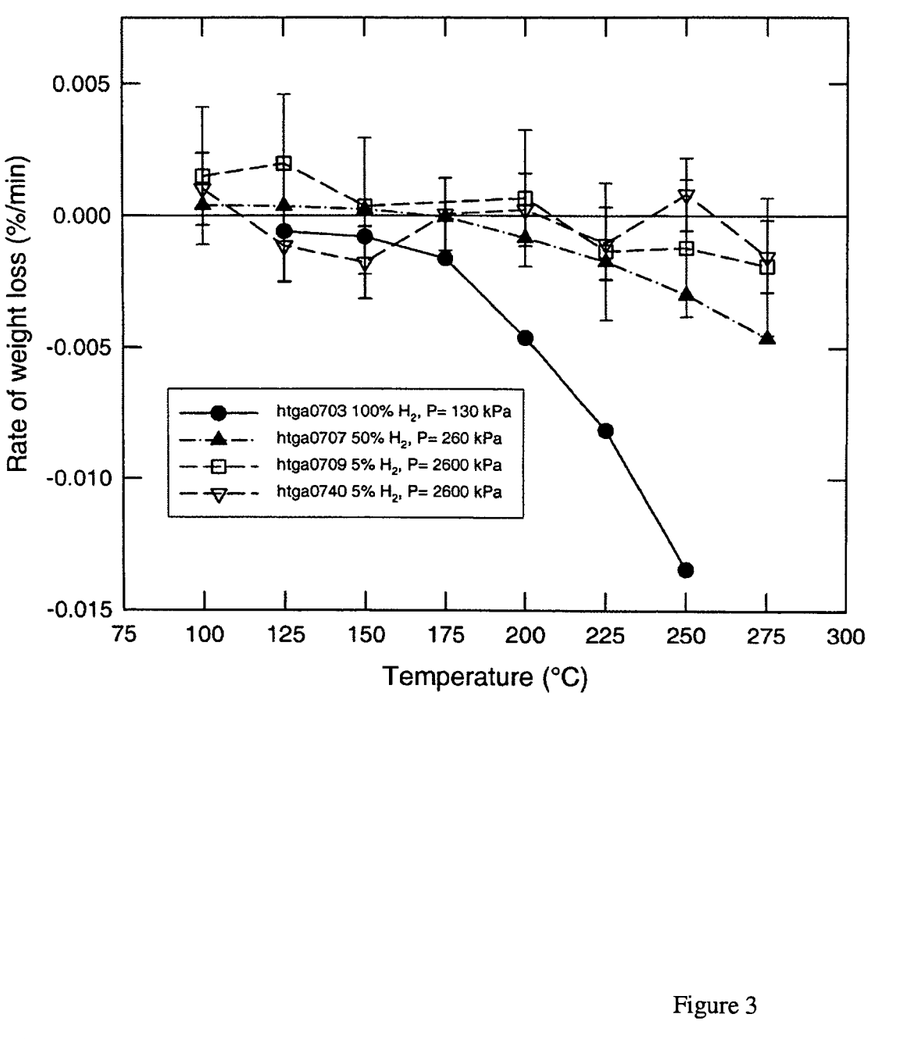
FIG. 3 shows a stepped temperature TGA summary for the system $LiNH_2+LiH$, comparing the rate of weight loss vs. temperature for three different gas mixtures at total gas pressures such that the $H_2$ partial pressure is 130 kPa (i.e 100% $H_2$ at 130 kPa, 50% $H_2/50\%$ $N_2$ at 260 kPa, and 5% $H_2/95\%$ $N_2$ at 2600 kPa). Two experiments were performed using the 5% $H_2/95\%$ $N_2$ gas mixture.

Referring to FIG. 1, the slopes of the weight curve for the isothermal sections provide one measure of gas generation as a function of temperature. The filled circles in FIG. 3 represent the rate of weight loss for the data of FIG. 1. Although weight loss does not provide direct information about whether the emitted gas is hydrogen or ammonia, other experiments for the present invention showed that the hydride is stable below 280° C. for hydrogen pressures above 100 kPa. Thus, all of the weight losses in FIG. 1 and in the filled circles of FIG. 3 are due to decomposition by releasing ammonia.

This interpretation is supported by the RGA data in FIG. 1, where $NH_3$ production is detected directly. Ammonia gas present in the TGA exhaust appears as an RGA signal at mass 17. Unfortunately, any water ($H_2O$) present in the exhaust also contributes to the mass 17 signal via its ionized OH⁻ radical. $H_2O$ is ubiquitous in almost any experimental apparatus, as $H_2O$ molecules adhere to internal surfaces, and heating the TGA tends to release these molecules into the exhaust stream. However, it is well established that the contribution to the mass 17 signal from the OH⁻ radical of $H_2O$ is 23% of the mass 18 signal due to $H_2O$. The normalized signal at mass 17 actually due to $NH_3$ is calculated via the formula:

$$\text{Normalized } NH_3 \text{ signal} = \text{mass 17 signal} - 0.23 \times \text{mass 18 signal} \quad (3)$$

Figure 4:
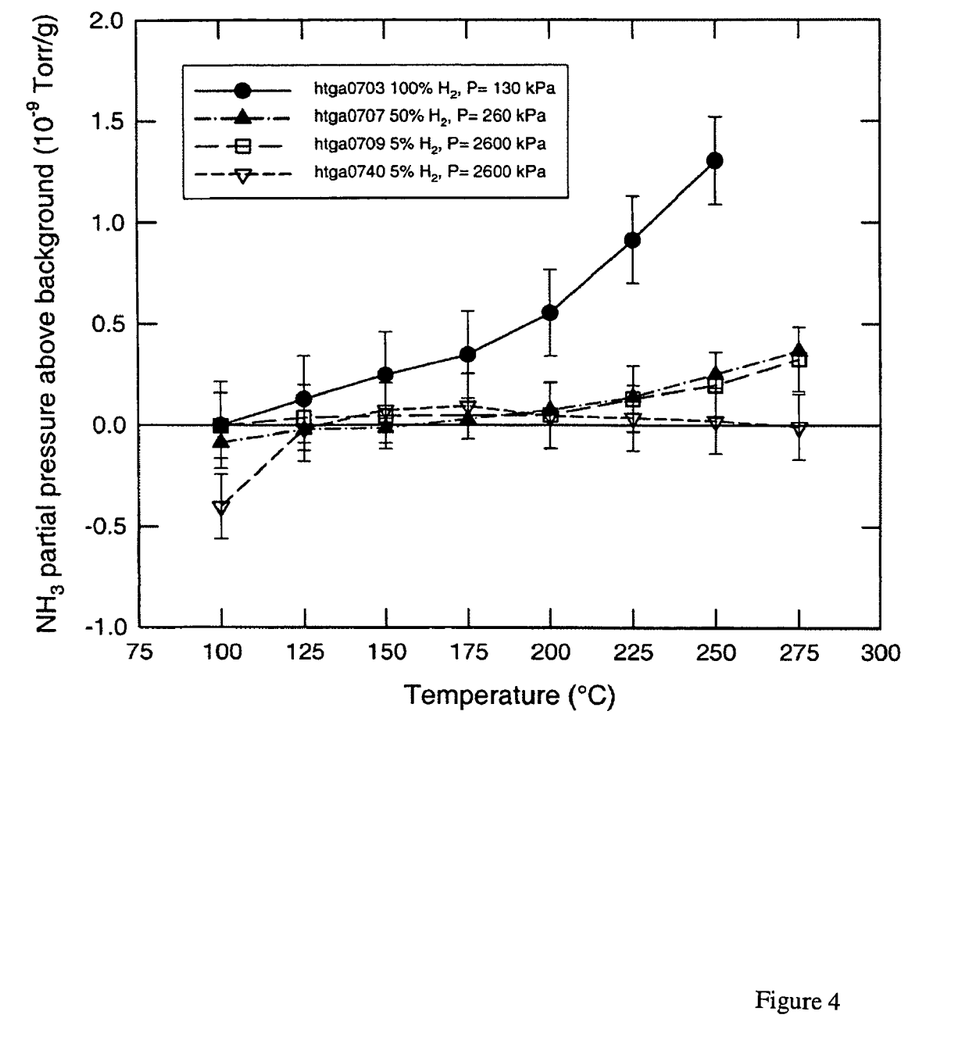
FIG. 4 shows a stepped temperature RGA summary for the system $LiNH_2+LiH$, comparing the normalized $NH_3$ RGA signal above background for three different gas mixtures at total gas pressures such that the $H_2$ partial pressure is 130 kPa (i.e 100% $H_2$ at 130 kPa, 50% $H_2/50\%$ $N_2$ at 260 kPa, and 5% $H_2/95\%$ $N_2$ at 2600 kPa).

In addition, there is a background instrumental signal in the mass spectrometer that occurs even in the absence of $NH_3$. This background contribution to the normalized $NH_3$ signal is about $4 \times 10^{-10}$ Torr at 200 min in FIG. 1, and also tends to drift slowly over time. In order to compensate for this background signal, it is assumed that the signal at mass 44 ($CO_2$) is proportional to this background, since there is neither evidence of, nor a theoretical mechanism for, generation of $CO_2$ by the sample. The true quantity of $NH_3$ generated is then obtained by subtracting the background signal, scaled assuming that no $NH_3$ is generated at 100° C. (other experiments have verified that $NH_3$ generation is negligible at temperatures this low), from the normalized $NH_3$ signal. These values are plotted as the filled circles in FIG. 4. In order to correctly compare experiments on samples having different starting masses, the $NH_3$ signal has been further normalized by dividing by the sample mass.

A similar experiment (not shown) was performed for the 50% $H_2$/50% $N_2$ gas mixture at 260 kPa; i.e., at the same $H_2$ partial pressure of 130 kPa. The results are shown as the solid triangles in FIGS. 3 and 4 for mass loss and normalized $NH_3$ RGA signal, respectively.

The weight measurements for the 100% $H_2$ and 50% $H_2$ gas mixtures had very low noise levels. In contrast, the 5% $H_2$/95% $N_2$ mixture at 2600 kPa has considerably greater noise, as shown in FIG. 2. The high noise level appears to be inherent to this combination of pressure, temperature and gas mixture. Two experiments were performed in an attempt to improve the signal-to-noise; the data in FIG. 2 are from the second, and less noisy, of the two runs. The resulting mass loss rates as functions of temperature are shown as the open symbols in FIG. 3, with the open inverted triangles corresponding to the data of FIG. 2. The error bars are rough estimates of the expected variability due to the high noise level. For the 100% and 50% $H_2$ experiments the error is less than the symbol size. The RGA data, on the other hand, show about the same levels of noise for all gas mixtures, and in FIG. 4 the error bars reflect the standard deviation of the RGA signal within each isothermal step.

Although FIG. 2 appears to show an increase in the normalized $NH_3$ signal in the temperature range of 100-125° C., this may be an experimental artifact at such relatively low temperature.

Figure 5:
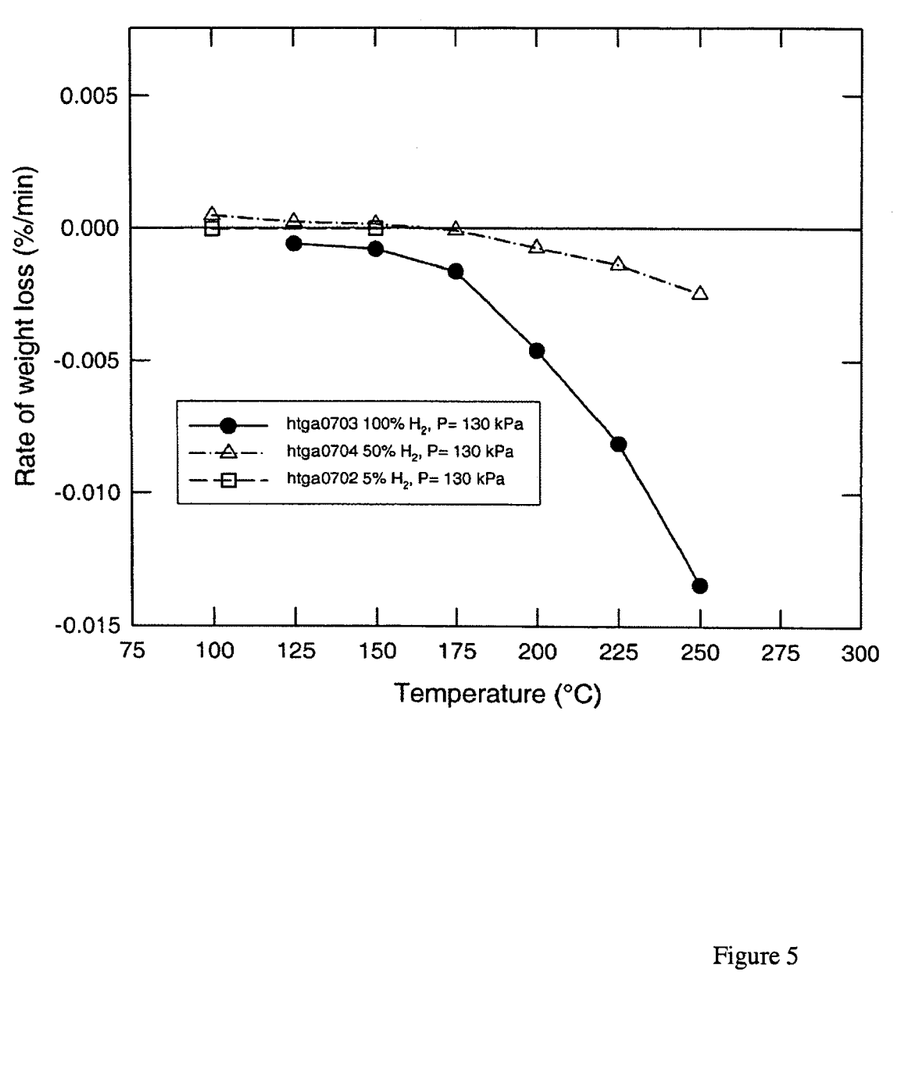
FIG. 5 shows a stepped temperature TGA summary for the system $LiNH_2+LiH$, comparing the rate of weight loss vs. temperature for three different gas mixtures (100% $H_2$, 50% $H_2/50\%$ $N_2$, and 5% $H_2/95\%$ $N_2$), each at a total gas pressure of 130 kPa. Data are shown only for those experimental conditions of pressure, temperature, and gas mixture for which no $H_2$ gas is evolved from the sample.
Figure 6:
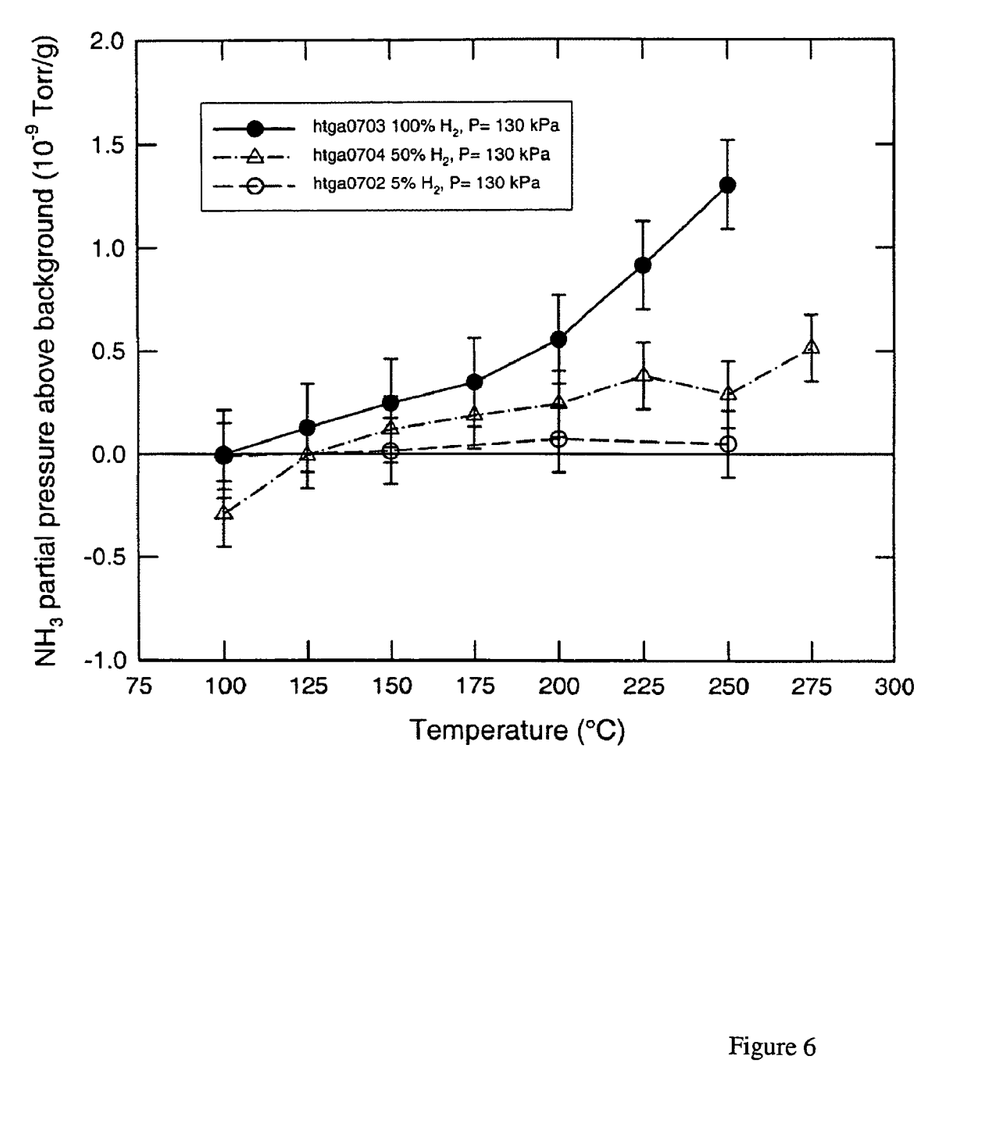
FIG. 6 shows a stepped temperature RGA summary for the system $LiNH_2+LiH$, comparing the normalized $NH_3$ RGA signal above background for three different gas mixtures (100% $H_2$, 50% $H_2/50\%$ $N_2$, and 5% $H_2/95\%$ $N_2$), each at a total gas pressure of 130 kPa total pressure.

FIGS. 5 and 6 show the rates of weight loss and the normalized $NH_3$ RGA signals, respectively, for the gas mixtures where the total pressure was maintained at 130 kPa. The filled circles for 100% $H_2$ are the same data as previously shown in FIGS. 3 and 4. FIG. 5 differs from FIG. 3 in that the sample can release hydrogen at lower temperature for the 5% and 50% $H_2$ mixtures due to the reduced $H_2$ partial pressures (6.5 and 65 kPa, respectively). Data points beyond those shown for the 5% $H_2$ mixture (open squares) and the 50% $H_2$ mixture (open triangles) have been omitted because the rates of weight loss are very large and also include rapid hydrogen desorption.

In summary, the stepped temperature experiments show the following features: (1) $NH_3$ generation is clearly evident in the baseline 100% $H_2$ experiment at 130 kPa pressure, as observed in both the mass loss rate and the normalized $NH_3$ partial pressure. Small quantities of $NH_3$ may be produced at temperatures as low as 125° C., and unambiguous $NH_3$ generation is evident at temperatures of 175° C. and higher. (2) The 5% $H_2$/95% $N_2$ mixture shows little or no $NH_3$ production at 2600 kPa (130 kPa $H_2$ partial pressure). The noise in the weight measurement produces uncertainty in the mass loss rate data, but to within experimental error the mass loss rate remains zero or very close to zero at all temperatures below 275° C. Of the two 5% $H_2$ experiments, one produced RGA data indicating no production of ammonia, and the other suggests that a small amount of ammonia production may occur above 225° C. (3) For the 50% $H_2$ mixture slight $NH_3$ production may occur above 200-225° C. (4) Results for the gas mixtures at 130 kPa total pressure are consistent with these results.

Scanned temperature experiments

Figure 7:
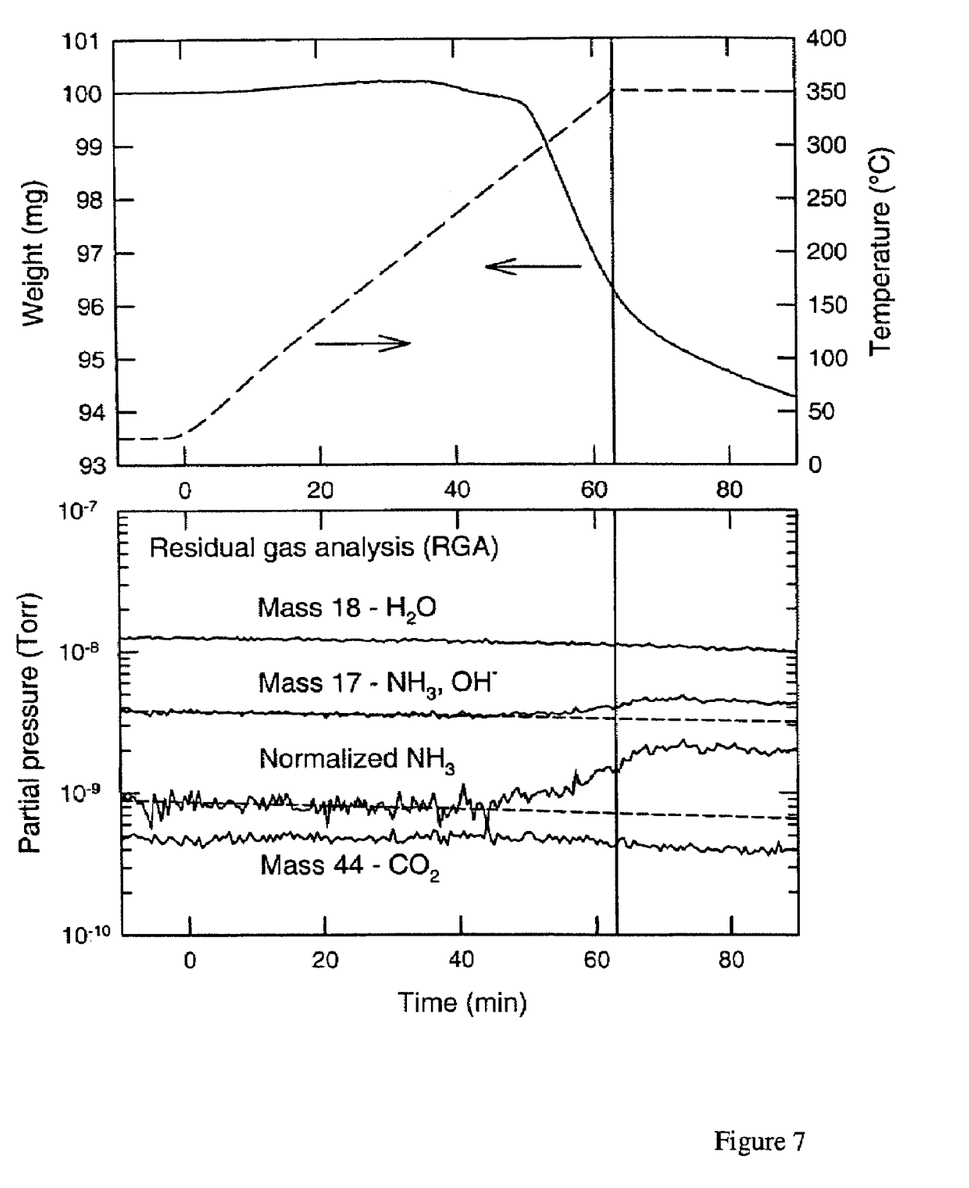
FIG. 7 shows a typical scanned temperature experiment showing weight vs. time (upper panel) and RGA signal vs. time (lower panel) as the temperature is ramped from room temperature to 350° C. at 5° C./min and then held constant at 350° C. The system is $LiNH_2+LiH$ in 100% $H_2$ gas at a pressure of 130 kPa. The vertical line at 63 minutes indicates the time at which the temperature reached 350° C.

Scanned temperature experiments were also performed, wherein the sample weight and RGA signals are monitored as the temperature is continuously increased at a heating rate of 5° C./min. FIG. 7 shows an example of such an experiment for the 100% $H_2$ condition. The upper panel is the weight (solid line) as a function of time during the temperature ramp (dashed line), where the start of the temperature ramp is defined to be t=0. The lower panel shows the corresponding RGA signals for mass 18, mass 17, mass 44, and normalized $NH_3$, as before. The maximum temperature was 350° C.

The mass data are more difficult to interpret in these experiments due to the effects of temperature ramp-induced transients in the weight and the simultaneous production of $H_2$ and $NH_3$ at high temperature. Ammonia production is unambiguous in the RGA data in the lower panel.

Prior to the release of any gases (<40 min) all of the RGA mass signals change linearly with time due to small drifts in the background level. The dashed lines on the mass 17 and normalized $NH_3$ curves are extrapolations of the background to longer times, showing that indeed ammonia is produced from the sample beginning at about 45 min.

Figure 8:
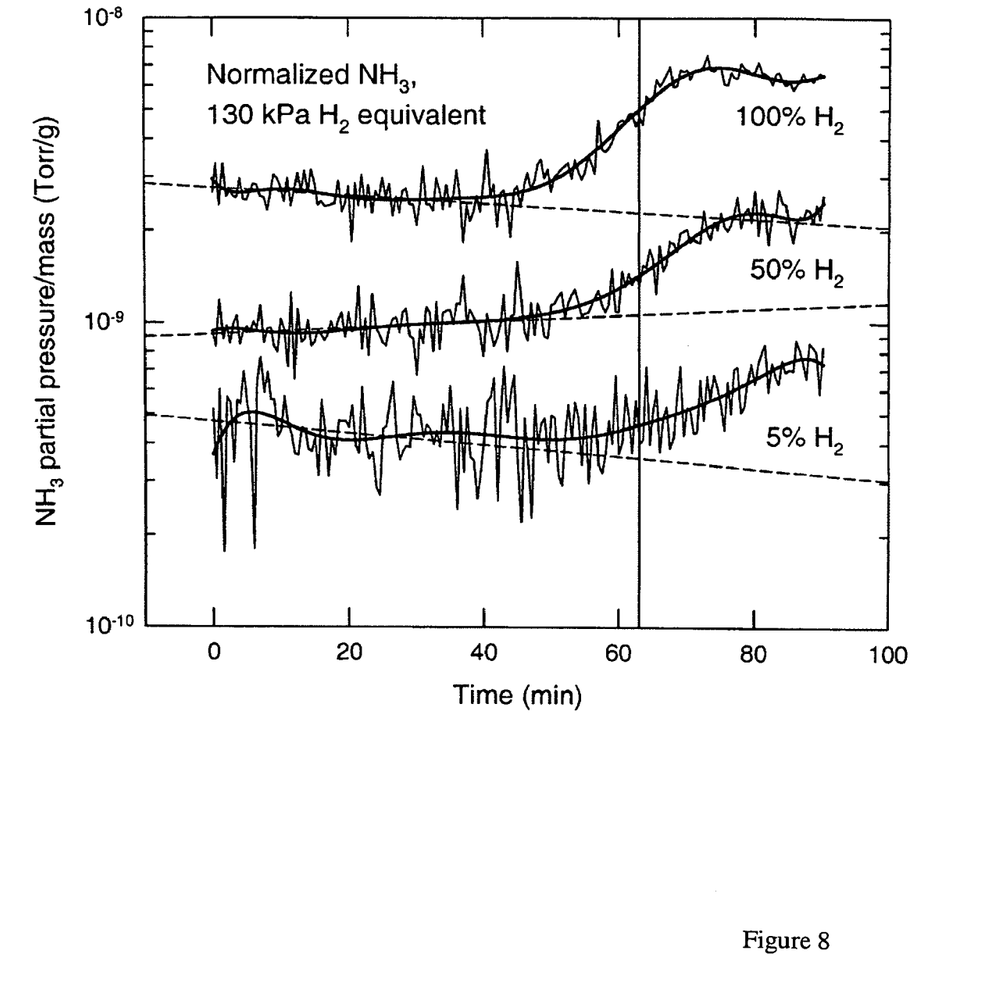
FIG. 8 shows normalized $NH_3$ signal as a function of time during heating from room temperature to 350° C. at 5° C./min, for the system $LiNH_2+LiH$, for three different gas mixtures at total pressures such that the $H_2$ partial pressure is 130 kPa (i.e 100% $H_2$ at 130 kPa, 50% $H_2/50\%$ $N_2$ at 260 kPa, and 5% $H_2/95\%$ $N_2$ at 2600 kPa). The vertical line at 63 minutes indicates the time at which the temperature reached 350° C. The temperature is then held constant at 350° C.
Figure 9:
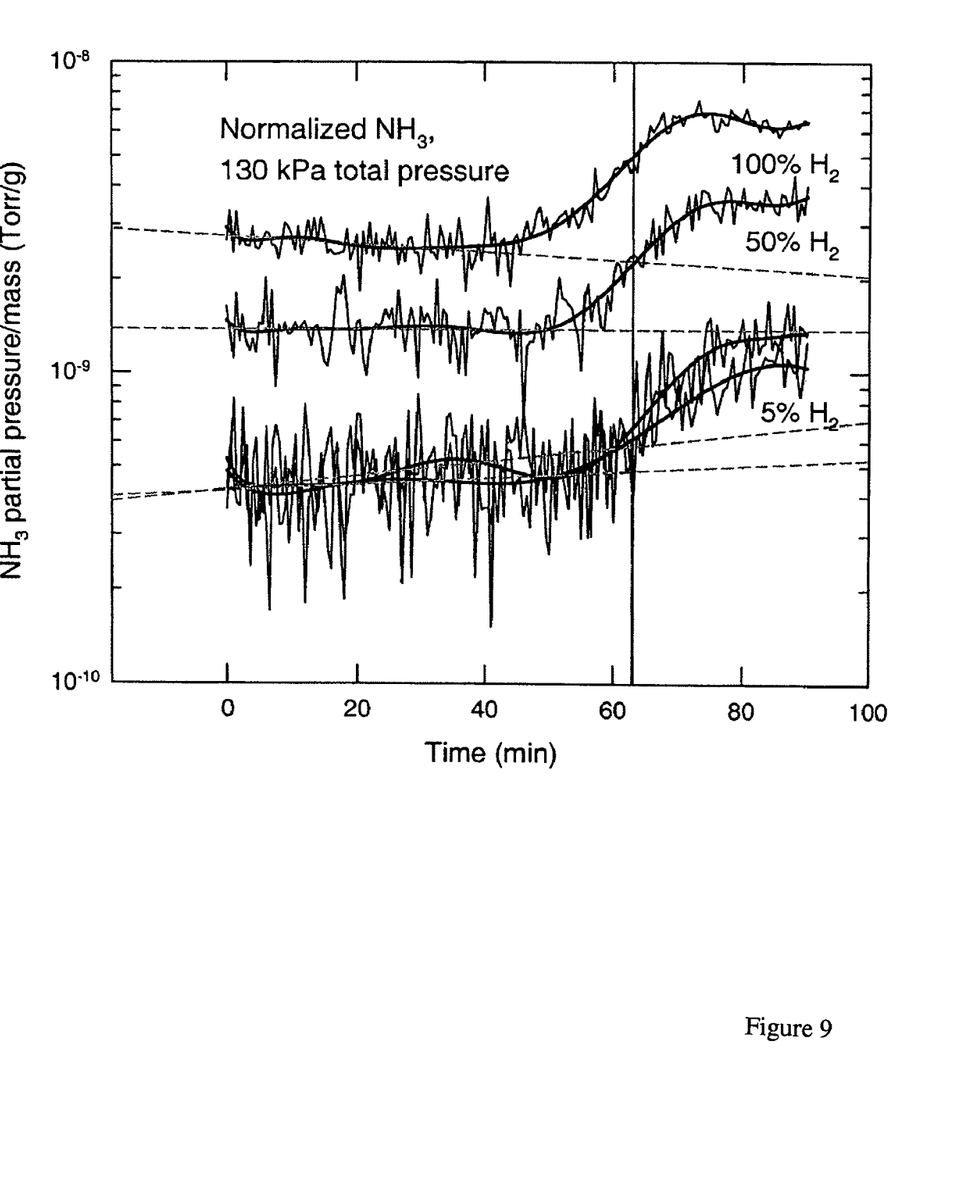
FIG. 9 shows normalized $NH_3$ signal as a function of time during heating from room temperature to 350° C. at 5° C./min, for the system $LiNH_2+LiH$, for three different gas mixtures (100% $H_2$, 50% $H_2/50\%$ $N_2$, and 5% $H_2/95\%$ $N_2$) each at 130 kPa total gas pressure. The vertical line at 63 minutes indicates the time at which the temperature reached 350° C. The temperature is then held constant at 350° C. Two experiments were conducted for the 5% $H_2/95\%$ $N_2$ gas mixture.

FIG. 8 summarizes the normalized $NH_3$ signal for 100%, 50%, and 5% $H_2$ at 130, 260, and 2600 kPa, respectively (equivalent 130 kPa $H_2$ partial pressure). As the $N_2$/$H_2$ ratio increases the onset of $NH_3$ release moves to longer times (higher temperatures) and the magnitude of the $NH_3$ signal above background decreases dramatically ($4.7 \times 10^{-9}$ Torr/g at 100% $H_2$, $1.1 \times 10^{-9}$ Torr/g at 50% $H_2$, and $4.6 \times 10^{-10}$ Torr/g at 5% $H_2$). A similar progression is observed for the case where the total atmosphere is held at 130 kPa (FIG. 9). In both cases the $NH_3$ level for the 5% $H_2$ mixture is so low that the signal-to-noise ratio is relatively poor.

Ammonia release onset times (and equivalent temperatures) were determined as follows. A $9^{th}$ order polynomial fit to the normalized $NH_3$ data was done in order to smooth the noise. The resulting fits are shown as the solid lines in FIGS. 8 and 9. The time derivative of the fit was calculated to determine the maximum rate of increase in the normalized $NH_3$ signal. The time at which the derivative reached 25% of its maximum value is representative of the time at which the rate of ammonia release became unambiguously detectable. This gives a realistic estimate of the onset time.

Figure 10:
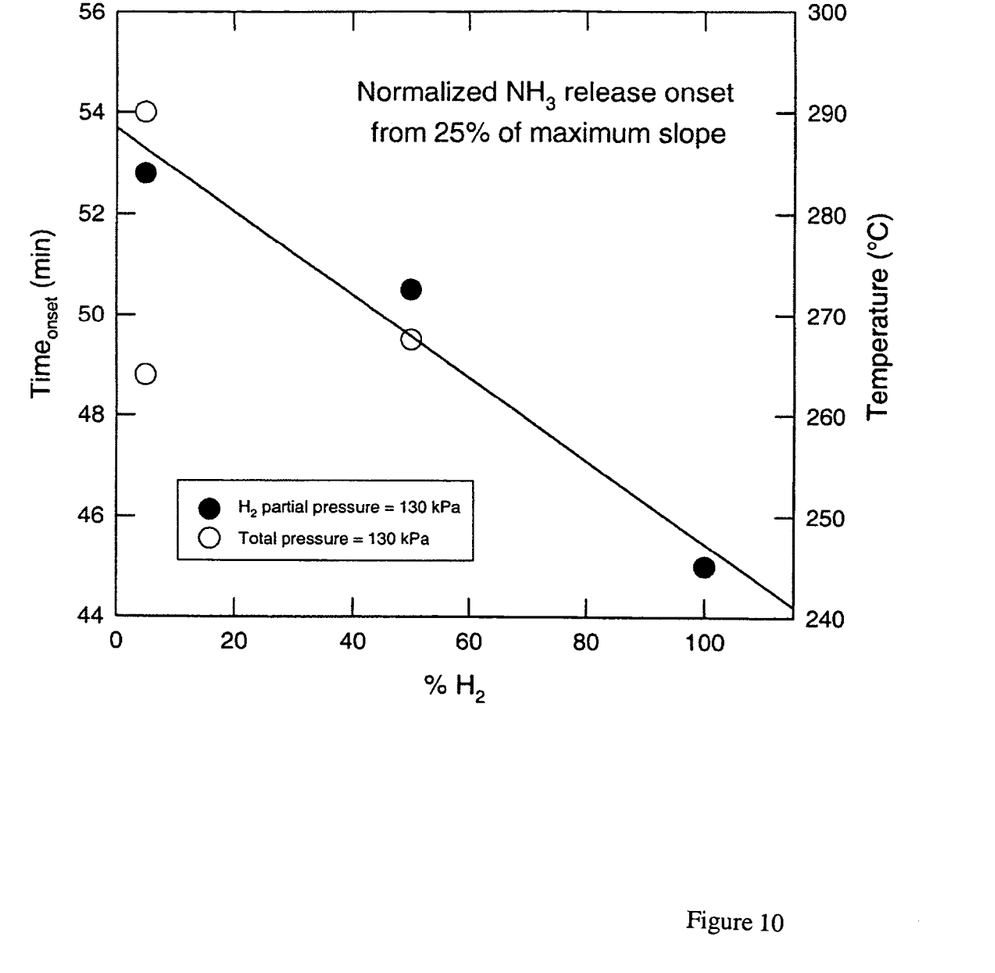
FIG. 10 shows a summary of onset times vs. percentage of $H_2$ in the $H_2/N_2$ gas mixture for the system $LiNH_2+LiH$. Filled circles represent data obtained for total gas pressures such that the $H_2$ partial pressure is 130 kPa. The line is linear fit to the data for total gas pressures equivalent to 130 kPa $H_2$ partial pressure (filled circles). The open circles represent data for gas mixtures at 130 kPa total gas pressure. The basis is normalized $NH_3$ release onset defined as the time at which the slope of the RGA signal versus time reaches 25% of the maximum slope.

The onset times are shown in FIG. 10. The solid circles correspond to cases where the $H_2$ partial pressure was maintained at 130 kPa, and the open circles correspond to 130 kPa total atmosphere. No attempt has been made to place quantitative error bars on the points, but there is uncertainty in the time based on the need to smooth the noise and the approximate nature of the analysis. The right hand axis shows an approximate temperature scale for the corresponding times, including an estimate that there is about a 3 min delay between the time gas is evolved from the sample and the time it reaches the mass spectrometer detector.

The onset temperatures are somewhat higher than those obtained in the stepped temperature method. The trends in the data are clear—increasing the $N_2$ concentration of the gas pushes the onset of ammonia release to higher temperatures, and decreases the quantity of ammonia released at high temperature (>280° C.), by as much as an order of magnitude in the case of 5% $H_2$.

In summary, the stepped temperature and scanned temperature experiments show many important advantages of including $N_2$ gas with the $H_2$ gas atmosphere:

First, ammonia loss from $LiNH_2+LiH$ hydrogen storage material is unambiguously detectable by both mass loss and direct RGA detection at 175° C. in pure $H_2$ gas at 130 kPa, and there is evidence for small amounts of $NH_3$ production even as low as 125° C. Ammonia production accelerates rapidly as the temperature increases.

Second, in a 5% $H_2$/95% $N_2$ mixture ammonia production is inhibited. The onset of ammonia release is moved up to at least 225° C. In the stepped temperature experiments, the evidence for any ammonia release is essentially absent, even up to 275° C. If ammonia release does occur in this temperature range, the quantity of ammonia released is much smaller than for the pure $H_2$ gas. The scanned temperature experiment shows that some ammonia release does occur at high temperature (>280° C.), but at a rate about one order of magnitude smaller than in pure $H_2$.

Third, the intermediate case of 50% $H_2$/50% $N_2$ shows a small amount of ammonia release starting at temperatures of about 200° C. The amount of ammonia evolved is diminished by about an unexpectedly substantial factor of 4-5 compared to that of pure $H_2$. Scanned temperature experiments are consistent with the interpretation that the onset temperature for $NH_3$ release is higher than that of pure $H_2$, but not quite as high as that of the 5% $H_2$ mixture.

Comparing the results for 130 kPa fixed $H_2$ partial pressure with the results for 130 kPa total pressure indicates that the $H_2/N_2$ mixture, rather than the $H_2$ partial pressure, is responsible for these effects. Thus, clearly, the presence of nitrogen gives a very beneficial result.

Accordingly, ammonia production from $LiNH_2+LiH$ is inhibited by the addition of $N_2$ to the $H_2$ gas used in absorption and desorption of hydrogen. The degree of inhibition depends on the percentage of $N_2$ gas in the mixture. The 5% $H_2$/95% $N_2$ mixture suppressed ammonia production completely, or nearly so, below 275° C. Inhibition by the 50% $H_2$/50% $N_2$ mixture was not quite as good, but still afforded a very marked increase in the onset temperature for ammonia release to about 200° C. and a very significant reduction in the rate of ammonia production at higher temperature compared to pure $H_2$ gas.

Thus, the $N_2$-containing atmosphere of the present invention provides reversible solid phase hydrogen storage, while reducing the evolution of $NH_3$ as compared to a system without $N_2$ in the atmosphere. This is especially advantageous in fuel cell applications where the presence of $NH_3$ in the fuel cell system is undesirable. Commercial grade hydrogen for fuel cell use typically contains at least 99.995 volume % hydrogen and the balance impurities, including water, $CO/CO_2$, and nitrogen. Glove box purifier regeneration grade hydrogen typically contains 2-10 volume % $H_2$ 80 to 95% $N_2$ and 3-10 volume % $CO_2$. These atmospheres are not anywhere known to be used in cycling a hydrogen storage system. Such atmospheres are useable in the present invention.

Greater $N_2$ decreases $NH_3$ formation and greater $H_2$ provides the necessary $H_2$ partial pressure for efficient fuel cell operation. For a preferred fuel cell anode feed, $H_2$ partial pressure of 2 to 5 atmospheres, a 50/50 mix of $H_2/N_2$ is delivered at 4 to 10 atmospheres.

Since the benefit of nitrogen to offset $NH_3$ formation is essentially proportional to the amount of $N_2$, the ranges of hydrogen and nitrogen content are varied. In various embodiments:

nitrogen is present along with a major portion of $H_2$, but less than 100% $H_2$;
at least about 1% $N_2$ and up to about 99% $H_2$;
at least about 5% $N_2$ and up to about 95% $H_2$;
at least about 8% $N_2$ and up to about 92% $H_2$;
at least about 10% $N_2$ and up to about 90% $H_2$;
at least about 20% $N_2$ and up to about 80% $H_2$;
at least about 30% $N_2$ and up to about 70% $H_2$;
at least about 40% $N_2$ and up to about 60% $H_2$; and
essentially 50% $N_2$ and 50% $H_2$, with trace impurities.

Also various nitrogen-rich formations, such as:

hydrogen is present along with a major portion of $N_2$, but less than 100% $N_2$;
at least about 8% $H_2$ and a major portion being $N_2$ up to about 92% $N_2$;
at least about 10% $H_2$ and a major portion being $N_2$ up to about 90% $N_2$;
at least about 20% $H_2$ and a major portion being $N_2$ up to about 80% $N_2$;
at least about 30% $H_2$ and a major portion being $N_2$ up to about 70% $N_2$; and
at least about 40% $H_2$ and a major portion being $N_2$ up to about 60% $N_2$.

It should be noted that volume percent and mole percent are equivalent. The term "major portion" indicates that the constituent referred to constitutes the largest volume fraction of the atmosphere. It should also be noted that the atmosphere constituent concentrations for hydriding and dehydriding may differ. Also, the atmosphere may change during hydriding (hydrogenating) and change during dehydriding (dehydrogenating).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system comprising solid media and a gaseous atmosphere, said solid media having a first condition which is hydrogenated and a second condition which is partially or fully dehydrogenated relative to said first condition, wherein said partially or fully dehydrogenated second condition of said solid media comprises an imide represented by $M^c(NH)^{-2}_{c/2}$, where M represents a cationic species selected from the group consisting of: Li, Mg, Na, B, Al, Be, Zn, and mixtures thereof and c represents an average valence state of M, wherein said imide forms at least two distinct compounds different from said imide via a reversible reaction with hydrogen, and wherein said gaseous atmosphere comprises nitrogen.

2. The system of claim 1 wherein said solid media is in said first hydrogenated condition and said gaseous atmosphere comprises nitrogen and helium.

3. The system of claim 1 wherein said solid media is in said first condition and said gaseous atmosphere consists essentially of nitrogen.

4. The system of claim 1 wherein the gaseous atmosphere comprises a mixture of gasses comprising said nitrogen.

5. The system of claim 1 wherein the gaseous atmosphere comprises a mixture of gasses, and said nitrogen constitutes the greatest amount by volume of any gaseous constituent in said mixture.

6. The system of claim 1 which comprises said solid media disposed in a container with said gaseous atmosphere flowing through said container.

7. The system of claim 1 wherein said solid media is in said second condition, and said gaseous atmosphere comprises a mixture of gasses including hydrogen for reaction with said media to form said first condition.

8. The system of claim 7 wherein the amount by volume of said nitrogen is greater than or equal to the amount by volume of said hydrogen of said atmosphere.

9. The system of claim 7 wherein the amount by volume of said hydrogen is greater than or equal to the amount by volume of said nitrogen of said atmosphere.

10. The system of claim 1 wherein said gaseous atmosphere comprises a mixture of gases including hydrogen.

11. The system of claim 10 wherein the amount by volume of said nitrogen is greater than or equal to the amount by volume of said hydrogen of said atmosphere.

12. The system of claim 10 wherein the amount by volume of said hydrogen is greater than or equal to the amount by volume of said nitrogen of said atmosphere.

13. The system of claim 1 wherein:
(a) in said first condition, said media comprises an amide and a hydride; and
(b) in said second condition, said composition comprises said imide.

14. The system of claim 13 wherein said imide is represented by the formula $Li_2NH$.

15. The system of claim 13 wherein said amide is represented by the formula $LiNH_2$.

16. The system of claim 13 wherein said hydride is represented by the formula $LiH$.

17. The system of claim 13 wherein said amide is represented by $MI^d[(NH_2)^{-1}]_d$ and said hydride represented by $MII^f H_f$, where MI and MII respectively represent cationic species or a mixture of cationic species other than hydrogen, and d and f respectively represent average valence states.

18. The system of claim 17 wherein M, MI and MII are each independently selected, and each represent a cation or mixture of cations different from hydrogen.

19. The system of claim 17 wherein said nitrogen in said gaseous atmosphere is present in an amount sufficient to inhibit formation of ammonia as compared to a system that does not include nitrogen.

20. A hydrogen storage system comprising a container housing a solid state reversible metal-nitrogen hydrogen storage composition comprising an amide and a hydride in a first hydrogenated state and an imide represented by $M^c(NH)^{-2}_{c/2}$ in a second partially or fully dehydrogenated state relative to said first state, where M represents a cationic species selected from the group consisting of: Li, Mg, Na, B, Al, Be, Zn, and mixtures thereof and c represents an average valence state of M, and a gaseous atmosphere comprising nitrogen.

21. A method of cycling hydrogen comprising:
reversibly storing hydrogen by reacting hydrogen gas with a dehydrogenated form of a reversible metal-nitrogen hydrogen storage composition in the presence of nitrogen gas to form a hydrogenated metal-nitrogen hydrogen storage composition; and releasing hydrogen from said hydrogenated metal-nitrogen hydrogen storage composition in the presence of nitrogen gas to suppress ammonia formation, wherein said dehydrogenated form of said reversible metal-nitrogen hydrogen storage composition comprises an imide represented by $M^c(NH)_{-2\ c/2}$, where M represents a cationic species selected from the group consisting of: Li, Mg, Na, B, Al, Be, Zn, and mixtures thereof and c represents an average valence state of M.

22. The method of claim 21 wherein said releasing is conducted in an atmosphere that comprises at least 1% by volume nitrogen.

23. The method of claim 22 wherein said atmosphere comprises at least 10% by volume nitrogen.

24. The method of claim 22 wherein said atmosphere comprises at least 50% by volume nitrogen.

25. The system of claim 21 wherein said storing is conducted in an atmosphere having said hydrogen and said nitrogen present in approximately equivalent amounts by volume.

26. A method of cycling hydrogen in a reversible solid state metal-nitrogen composition having a hydrogenated state and a dehydrogenated state comprising: liberating hydrogen from a hydrogenated state of said metal-nitrogen composition comprising an amide and a hydride by heating said composition in a nitrogen-containing atmosphere at an elevated temperature sufficient to evolve hydrogen gas therefrom while suppressing ammonia production to produce said dehydrogenated state comprising an imide represented by $M^c(NH)^{-2}_{c/2}$, where M represents a cationic species selected from the group consisting of: Li, Mg, Na, B, Al, Be, Zn, and mixtures thereof and c represents an average valence state of M; and generating a hydrogenated state of said metal-nitrogen composition by exposing said dehydrogenated state to an atmosphere comprising hydrogen gas and nitrogen gas, wherein said nitrogen suppresses ammonia production.

27. The method of claim 26 wherein the nitrogen-containing atmosphere comprises a mixture of gasses comprising said nitrogen.

28. The method of claim 27 wherein said imide is lithium imide represented by $Li_2NH$ and said amide is represented by $LiNH_2$.

29. The method of claim 28 wherein said generating is conducted according to: $Li_2NH + H_2 \rightarrow LiNH_2 + LiH$.

30. A method of suppressing ammonia production in a reversible metal-nitrogen hydrogen storage system composition having a hydrogenated state comprising an amide and a hydride and a dehydrogenated state comprising an imide represented by $M^c(NH)^{-2}_{c/2}$, where M represents a cationic species selected from the group consisting of: Li, Mg, Na, B, Al, Be, Zn, and mixtures thereof and c represents an average valence state of M, the method comprising: generating hydrogen from a hydrogenated state of said metal-nitrogen composition by heating said composition in a nitrogen-containing atmosphere at an elevated temperature sufficient to evolve hydrogen gas therefrom while suppressing ammonia production to produce said dehydrogenated state comprising said imide; and generating said hydrogenated state of said metal-nitrogen composition by exposing said dehydrogenated state to an atmosphere comprising hydrogen gas and nitrogen gas while suppressing ammonia production.

* * * * *